W. W. BALCOM.
LIQUID CONTAINER INDICATOR.
APPLICATION FILED AUG. 9, 1916.
1,265,724.
Patented May 14, 1918.
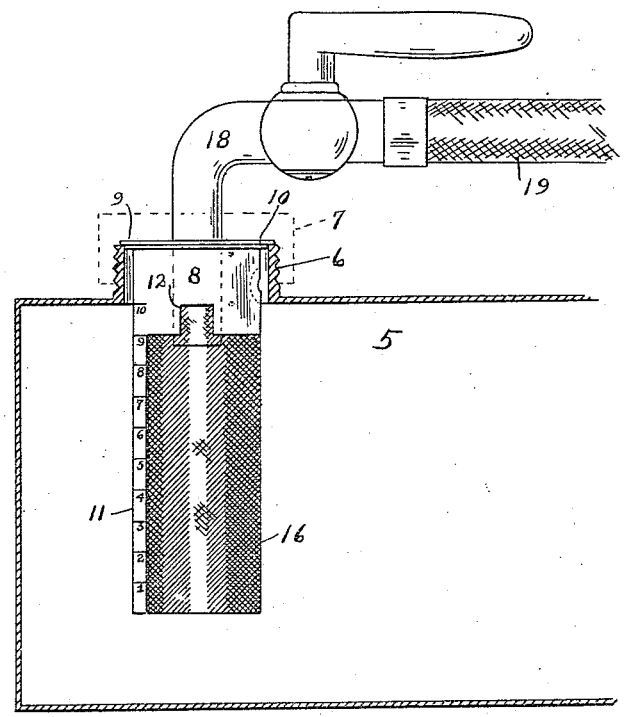
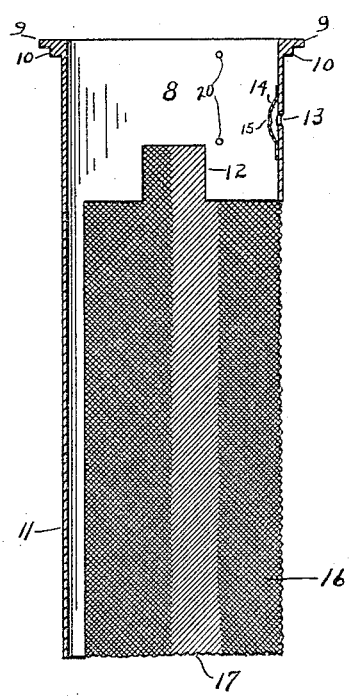
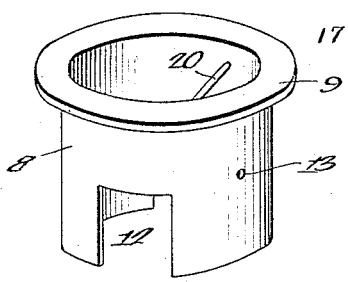
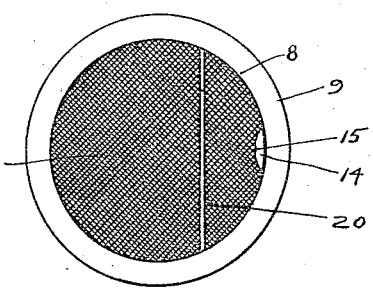
Inventor
W. W. BALCOM
Milton S. Crandall,
Attorney

UNITED STATES PATENT OFFICE.

WILLIAM W. BALCOM, OF SIOUX CITY, IOWA.

LIQUID-CONTAINER INDICATOR.

1,265,724.

Specification of Letters Patent.

Patented May 14, 1918.

Application filed August 9, 1916. Serial No. 113,907.

*To all whom it may concern:*

Be it known that I, WILLIAM W. BALCOM, a citizen of the United States, and a resident of Sioux City, in the county of Woodbury and State of Iowa, have invented certain new and useful Improvements in Liquid-Container Indicators, of which the following is a specification.

The present invention relates to filling and quantity indicating means for liquid containers.

The invention has for its primary object the production of improved means for indicating the level of liquid in a container.

Another object of the invention is the production of a combined strainer gage and signal which shows the level of liquid in a container and signals an attendant filling the container, when the latter is filled.

A further object of the invention is the production of a liquid-container filled device embodying an audible signal actuated by entrance of liquid into the container to indicate the liquid level.

The invention further contemplates a device of this class inexpensive in manufacture and adapted to be readily attached to the fuel tanks of motor vehicles.

With these and other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Figure 1 is a vertical section of a gasolene tank equipped with the preferred embodiment of the invention; Fig. 2 is an enlarged vertical section of the strainer and signal tube; Fig. 3 is a plan of the same; and Fig. 4 is a perspective view of the tube.

The invention contemplates a tube which extends a distance into the tank and is provided above the normal liquid line with a whistle opening. As the liquid is introduced through the tube, the air which the liquid displaces within the tank rushes out through the tube. As the liquid rises and the space between the tube and the liquid becomes insufficient to permit the air to pass out through the tube, the air will pass through the whistle opening with sufficient force to sound the whistle, and thus notify the attendant that the tank is filled.

Although I have illustrated and hereinafter described the preferred form of the invention, I would not be understood as being limited to the specific structure chosen for illustration for various alterations and modifications, in the details of construction and arrangement of parts, may be made without departing from the spirit and scope of the invention as defined in the appended claims.

Referring, now, to the illustrations, 5 represents a familiar form of gasolene tank, provided with an opening encircled by a flange, 6, threaded to receive the usual screw-cap, 7.

The flange, 6, freely encircles a tube, 8, of any suitable material and design and provided with a flange, 9, which rests on the flange, 6, to support the tube.

The flange, 9, is formed with an annular shoulder, 10, or other stop suitable to engage the flange, 6, to hold the tube in spaced relation to the latter.

In the present embodiment, it is assumed that the normal liquid line is coincident the top wall of the tank; and the tube, 8, extends a distance below the normal line.

The tube may be formed at one side with a depending scale, 11, graduated with any preferred units of measurement.

The tube may be provided with one or more notches, or cut-out portions, 12, which extend from the lower edge of the tube to the normal liquid level.

Above the liquid level the tube is provided with an opening, 13, and on the inner side of the tube is secured a dished plate, 14, the dished portion of which is spaced from the side of the tube and provided with a central opening, 15, which registers with the opening, 13. It will thus be seen that the dished plate and the adjacent apertured portion of the tube afford a familiar form of whistle.

From the tube may depend a straining member of any suitable pervious material and including side walls, 16, and a bottom, 17.

In Fig. 1, the tank is represented as being filled by a faucet, 18, on a hose, 19, the faucet being extended into the tube, 8, as shown by dotted lines, yet it is evident the liquid may be introduced through the tube in any preferred manner, as by a funnel, direct pouring, or otherwise.

To prevent the faucet, funnel, or other spouted member which may be employed, from coming in contact with the whistle, I provide a suitable guard, as by extending one or more bars, 20, across the tube, and securing the ends to the latter.

The air displaced in filling the tank, must enter the tube 8, either through its lower end, through the cut out portions, or through the whistle opening, and pass out the upper end of the tube, between the walls thereof and the column of liquid. When the liquid level reaches the lower end of the tube, the cutout portions, 12, being too small to pass the air as rapidly as it is displaced, a portion of the air rushes through and sounds the whistle, thus notifying the attendant that the tank is very nearly filled. The whistle opening being above the liquid level and the cutout portions of the tube, it is evident, that after the cutout portions are submerged, the increased air pressure amplifies the sound of the whistle.

Obviously, the presence of the cutout portions, 12, is not essential, their only purpose being to change the sound of the whistle,— that is, when the liquid level reaches the lower end of the tube, 8, the whistle starts to sound, notifying the attendant that the tank is almost filled, then when the whistle sounds louder, the attendant is informed that the normal level is reached.

The present embodiment is so designed that after the signal starts to sound, one more measuring unit of liquid may be introduced.

The tube may be readily withdrawn, at any time, to determine the quantity of liquid in the container as shown by the wet portion of the scale.

Obviously, the presence of the scale and straining member is arbitrary.

Having thus described my invention what I claim as new and desire to secure by Letters Patent of the United States, is,—

1. A filling signal for a liquid-containing tank having a liquid receiving opening in its top, comprising a tube extending from the opening to a point below the normal liquid level, the tube being substantially all inclosed by the tank, and having a side opening, and a whistle within the tube over the latter opening.

2. In a filling signal for a liquid container having an opening to admit liquid and eject air, an open ended tube adapted to be introduced into the opening and extend a distance below the normal liquid level, the side of the tube having an apertured portion below the normal liquid level, and an opening above the apertured portion, and a dished apertured plate secured to the side of the tube over said opening to afford a whistle sounded by air displaced by filling the container.

3. The combination with a liquid container, of a tube depending from the top thereof to a point below the normal liquid level and adapted to admit liquid into and eject air from the container, the side of the tube having an apertured portion below the normal liquid level and an opening above the apertured portion, and a dished apertured plate secured to the side of the tube and over the opening to provide a whistle sounded by air displaced by filling the container.

4. In a filling signal for a liquid container having an opening therein, a tube to extend through the opening a distance below the normal liquid level, adapted to receive a filling spout and having a whistle in its side actuated by air displaced in filling the container, and a guard within the tube and spaced from the whistle to keep the spout from contact with the whistle.

5. In a filling signal for a liquid container having an opening therein, a tube to extend through the opening a distance below the normal liquid level, adapted to receive a filling spout, and having a whistle in its side actuated by air displaced in filling the container, and members extending across the tube, and above and below the whistle to keep the spout from contact with the whistle.

In testimony, whereof, I have hereunto set my hand this 24th day of July, 1916.

WILLIAM W. BALCOM.